(12) United States Patent
Tessitore et al.

(10) Patent No.: US 9,776,917 B2
(45) Date of Patent: Oct. 3, 2017

(54) COATING ON PDC/TSP CUTTER FOR ACCELERATED LEACHING

(71) Applicant: Smith International, Inc., Houston, TX (US)

(72) Inventors: Ted Tessitore, The Woodlands, TX (US); Anthony Griffo, The Woodlands, TX (US); Yuelin Shen, Spring, TX (US); Youhe Zhang, Spring, TX (US); Madapusi K. Keshavan, The Woodlands, TX (US)

(73) Assignee: SMITH INTERNATIONAL, INC., Houston, TX (US)

( * ) Notice: Subject to any disclaimer, the term of this patent is extended or adjusted under 35 U.S.C. 154(b) by 146 days.

(21) Appl. No.: 14/802,827

(22) Filed: Jul. 17, 2015

(65) Prior Publication Data

US 2015/0321952 A1 Nov. 12, 2015

Related U.S. Application Data

(62) Division of application No. 13/433,185, filed on Mar. 28, 2012, now abandoned.

(60) Provisional application No. 61/468,849, filed on Mar. 29, 2011.

(51) Int. Cl.
*C03C 25/68* (2006.01)
*E21B 10/54* (2006.01)
*C22C 26/00* (2006.01)
*C22C 1/10* (2006.01)
*B22F 3/24* (2006.01)

(52) U.S. Cl.
CPC ............ *C03C 25/68* (2013.01); *C22C 1/1094* (2013.01); *C22C 26/00* (2013.01); *E21B 10/54* (2013.01); *B22F 2003/244* (2013.01)

(58) Field of Classification Search
CPC .............. E21B 10/54; C22B 3/06; C22B 3/00
See application file for complete search history.

(56) References Cited

U.S. PATENT DOCUMENTS

| | | |
|---|---|---|
| 4,104,344 A | 8/1978 | Pope et al. |
| 4,224,380 A | 9/1980 | Bovenkerk et al. |
| 4,288,248 A | 9/1981 | Bovenkerk et al. |
| 4,525,178 A | 6/1985 | Hall |
| 4,694,918 A | 9/1987 | Hall |
| 4,976,324 A | 12/1990 | Tibbitts |
| 5,127,923 A | 7/1992 | Bunting et al. |
| 5,188,900 A | 2/1993 | Revis et al. |

(Continued)

FOREIGN PATENT DOCUMENTS

| | | | |
|---|---|---|---|
| CN | 101787530 A | 7/2010 | |
| GB | 2465260 | * 5/2010 | ........... C04B 35/528 |

OTHER PUBLICATIONS

Office Action issued in CN201280026392.8 on Jul. 1, 2015; 23 pages with English translation.

(Continued)

*Primary Examiner* — Pegah Parvini (57) ABSTRACT

A cutting element includes a polycrystalline diamond layer having a cutting face and a diamond layer side surface, a substrate attached to the polycrystalline diamond layer, the substrate having a bottom surface and a substrate side surface, an interface between the diamond layer and the substrate, and a mask covering at least the bottom surface and the substrate side surface of the cutting element.

20 Claims, 6 Drawing Sheets

(56) References Cited

U.S. PATENT DOCUMENTS

| | | | |
|---|---|---|---|
| 5,370,195 A | 12/1994 | Keshavan et al. | |
| 2007/0169419 A1 | 7/2007 | Davis et al. | |
| 2008/0206576 A1* | 8/2008 | Qian | B24D 3/10 |
| | | | 428/446 |
| 2010/0012390 A1 | 1/2010 | Shamburger | |
| 2010/0243336 A1 | 9/2010 | Dourfaye et al. | |
| 2011/0056141 A1* | 3/2011 | Miess | B24D 18/0054 |
| | | | 51/295 |

OTHER PUBLICATIONS

International Search Report and Written Opinion of PCT Application No. PCT/US2012/031208 dated Dec. 26, 2012: pp. 1-11.
Chinese Office Action dated Nov. 4, 2014, pp. 1-21 for CN Application No. 2012800263928, filed on Mar. 29, 2012.

* cited by examiner

COATING ON PDC/TSP CUTTER FOR ACCELERATED LEACHING

CROSS-REFERENCE TO RELATED APPLICATIONS

This application is a divisional application of U.S. application Ser. No. 13/433,185, filed on Mar. 28, 2012, which claims the benefit of and priority to U.S. Provisional Application 61/468,849 filed on Mar. 29, 2011, which is herein incorporated by reference in its entirety.

BACKGROUND

Technical Field

Embodiments disclosed herein relate generally to polycrystalline diamond composites and cutting structures. More particularly, embodiments disclosed herein relate to methods of leaching polycrystalline diamond cutting elements.

Background Art

Polycrystalline diamond compact ("PDC") cutters have been used in industrial applications including rock drilling and metal machining for many years. In a typical application, a compact of polycrystalline diamond (PCD) (or other superhard material) is bonded to a substrate material, which is typically a sintered metal-carbide to form a cutting structure. PCD comprises a polycrystalline mass of diamonds (typically synthetic) that are bonded together to form an integral, tough, high-strength mass or lattice. The resulting PCD structure produces enhanced properties of wear resistance and hardness, making PCD materials extremely useful in aggressive wear and cutting applications where high levels of wear resistance and hardness are desired.

A PDC cutting element may be formed by placing a cemented carbide substrate into the container of a press. A mixture of diamond grains or diamond grains and catalyst binder is placed atop the substrate and treated under high pressure, high temperature conditions. In doing so, metal binder (often cobalt) migrates from the substrate and passes through the diamond grains to promote intergrowth between the diamond grains. As a result, the diamond grains become bonded to each other to form the diamond layer, and the diamond layer is in turn bonded to the substrate. The substrate often comprises a metal-carbide composite material, such as tungsten carbide. The deposited diamond layer is often referred to as the "diamond table" or "abrasive layer."

Conventional PCD includes 85-95% by volume diamond and a balance of the binder material, which is present in PCD within the interstices existing between the bonded diamond grains. Binder materials that are typically used in forming PCD include Group VIII elements, with cobalt (Co) being the most common binder material used.

Figure 1:
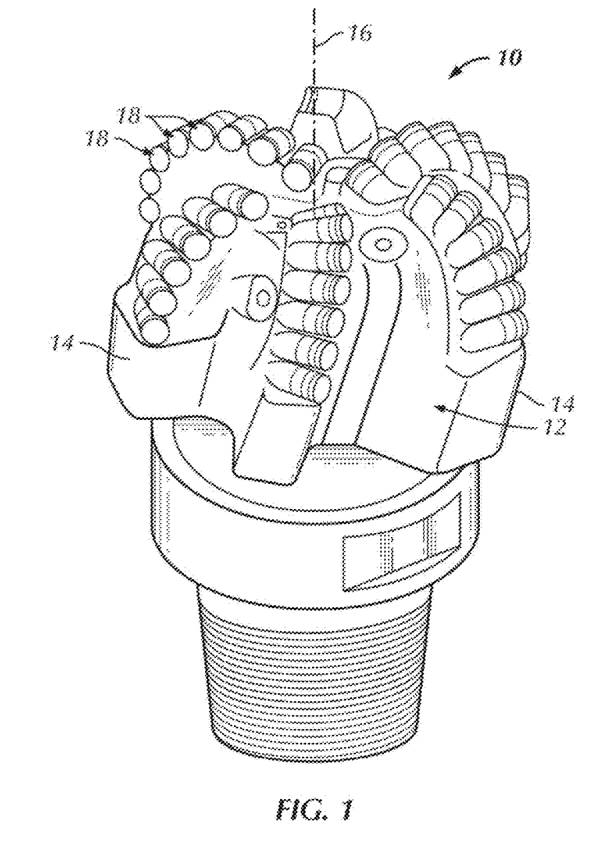
FIG. 1 is an illustration of a PCD drill bit.

An example of a drag bit for earth formation drilling using PDC cutters is shown in FIG. 1. FIG. 1 shows a rotary drill bit 10 having a bit body 12. The lower face of the bit body 12 is formed with a plurality of blades 14, which extend generally outwardly away from a central longitudinal axis of rotation 16 of the drill bit. A plurality of PDC cutters 18 are disposed side by side along the length of each blade. The number of PDC cutters 18 carried by each blade may vary. The PDC cutters 18 are individually brazed to a stud-like carrier (or substrate), which may be formed from tungsten carbide, and are received and secured within sockets in the respective blade.

A significant factor in determining the longevity of PDC cutters is the generation of heat at the cutter contact point, specifically at the exposed part of the PDC layer, caused by friction between the PCD and the work material. This heat causes thermal damage to the PCD in the form of cracks (due to differences in thermal expansion coefficients) which lead to spalling of the polycrystalline diamond layer, delamination between the polycrystalline diamond and substrate, and back conversion of the diamond to graphite causing rapid abrasive wear. The thermal operating range of conventional PDC cutters is typically 700° C. or less.

As mentioned, conventional polycrystalline diamond is stable at temperatures of up to 700° C., after which observed increases in temperature may result in permanent damage to and structural failure of polycrystalline diamond. This deterioration in polycrystalline diamond is due to the significant difference in the coefficient of thermal expansion of the binder material, cobalt, as compared to diamond. Upon heating of polycrystalline diamond, the cobalt and the diamond lattice will expand at different rates, which may cause cracks to form in the diamond lattice structure and result in deterioration of the polycrystalline diamond. However, thermal fatigue does not only occur at temperatures above 700° C. Rather, the differential expansion (between cobalt and diamond) even occurs at temperatures as low as 300-400° C., still causing thermal fatigue in the diamond body. Further, damage to polycrystalline diamond can also result from the loss of some diamond-to-diamond bonds (from the initiation of a graphitization process) leading to loss of microstructural integrity and strength loss.

In order to overcome this problem, strong acids may be used to "leach" the binder from the diamond lattice structure (either a thin volume or entire tablet) to at least reduce the damage experienced from heating diamond-binder composite at different rates upon heating. Examples of "leaching" processes can be found, for example, in U.S. Pat. Nos. 4,288,248 and 4,104,344. Briefly, a strong acid, typically nitric acid or combinations of several strong acids (such as nitric and hydrofluoric acid) may be used to treat the diamond table, removing at least a portion of the co-catalyst from the PDC composite. By leaching out the binder, thermally stable polycrystalline (TSP) diamond may be formed. In certain embodiments, only a select portion of a diamond composite is leached, in order to gain thermal stability without losing impact resistance. As used herein, the term TSP includes both of the above (i.e., partially and completely leached) compounds. Interstitial volumes remaining after leaching may be reduced by either furthering consolidation or by filling the volume with a secondary material, such as by processes known in the art and described in U.S. Pat. No. 5,127,923, which is herein incorporated by reference in its entirety.

Accordingly, there exists a continuing need for developing methods and apparatuses that accelerate the leaching process, and/or reduce the hazards inherent in the leaching process.

SUMMARY

In one aspect, embodiments disclosed herein relate to a cutting element that includes a polycrystalline diamond layer having a cutting face and a diamond layer side surface, a substrate attached to the polycrystalline diamond layer, the substrate having a bottom surface and a substrate side surface, an interface between the diamond layer and the substrate, and a mask covering at least the bottom surface and the substrate side surface of the cutting element.

In another aspect, embodiments disclosed herein relate to a method for leaching a cutting element that includes providing a cutting element, the cutting element having a substrate and polycrystalline diamond layer attached to the substrate, masking at least the substrate portion of the cutting element with a mask, leaving an unmasked portion of the diamond layer of the cutting element, placing the masked cutting element in a leaching agent, wherein at least the unmasked portion of the cutting element contacts the leaching agent, and removing the masked cutting element from the leaching agent.

In yet another aspect, embodiments disclosed herein relate to a method of leaching a cutting element that includes providing a cutting element, the cutting element having a substrate and polycrystalline diamond layer attached to the substrate, fitting at least the substrate portion of the cutting element in a pre-formed mask, leaving an unmasked portion of the diamond layer of the cutting element, placing the cutting element in a leaching agent, wherein at least the unmasked portion of the cutting element contacts the leaching agent, and removing the cutting element from the leaching agent.

Other aspects and advantages of the invention will be apparent from the following description and the appended claims.

DETAILED DESCRIPTION

Embodiments described herein relate to polycrystalline diamond cutting elements and to methods of leaching the same. Polycrystalline diamond cutting elements of the present disclosure include a carbide substrate and a polycrystalline diamond layer attached thereon. The methods of leaching described below include protecting the carbide substrate from the leaching process.

As used herein, the term "PCD" refers to polycrystalline diamond that has been formed, at high pressure/high temperature (HPHT) conditions, through the use of a solvent metal catalyst, such as those included in Group VIII of the Periodic Table. The term "thermally stable polycrystalline diamond" (TSP), as used herein, refers to intercrystalline bonded diamond that includes a volume or region that has been rendered substantially free of the solvent metal catalyst used to form PCD, or the solvent metal catalyst used to form PCD remains in the region of the diamond body but is otherwise reacted or rendered ineffective in its ability to adversely impact the bonded diamond at elevated temperatures as discussed above.

Figure 2:
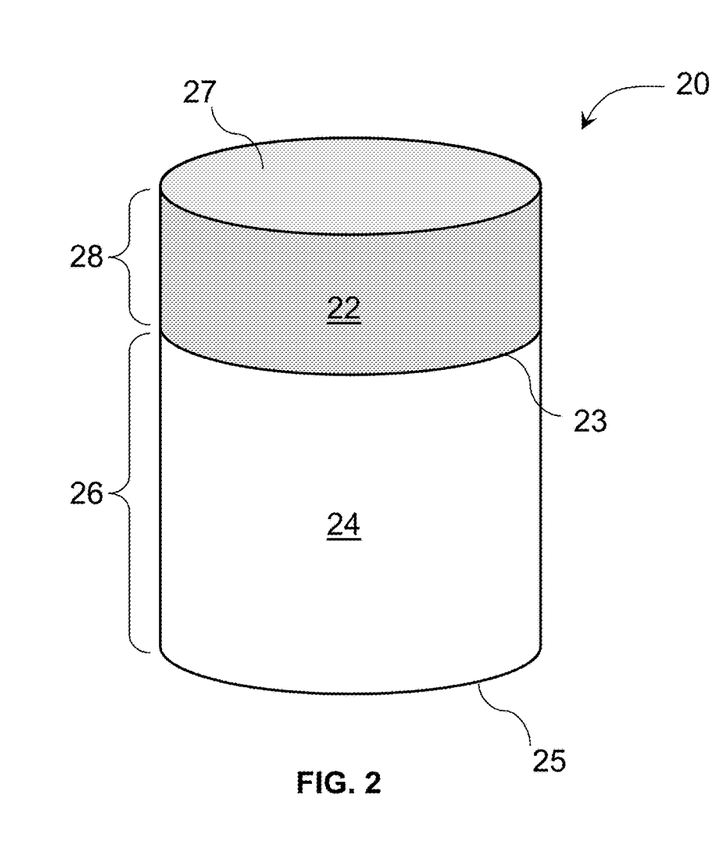
FIG. 2 shows a PCD cutting element.

Referring to FIG. 2, a PCD cutting element 20 has a polycrystalline diamond (PCD) layer 22 attached to a substrate 24. The substrate 24 has a bottom surface 25 and a substrate side surface 26. The PCD layer has a cutting face 27 and a diamond layer side surface 28. An interface 23 is formed between the PCD layer 22 and the substrate 24. The diamond layer side surface 28 and the substrate side surface 26 together form the outer surface of the PCD cutting element. The outer surface of PCD cutting elements of the present disclosure may be referred herein to as the "outer side surface," the "side surface," the "outer circumferential surface," or the like.

Forming Polycrystalline Diamond

A PCD layer may be formed in a conventional manner, such as by HPHT sintering of "green" particles to create intercrystalline bonding between the particles. Examples of HPHT processes can be found, for example, in U.S. Pat. Nos. 4,694,918; 5,370,195; and 4,525,178. Briefly, to form PCD, an unsintered mass of diamond crystalline particles is placed within a metal enclosure of the reaction cell of a HPHT apparatus. A metal catalyst, such as cobalt or other Group VIII metals, may be included with the unsintered mass of crystalline particles to promote intercrystalline diamond-to-diamond bonding. The catalyst material may be provided in the form of powder and mixed with the diamond grains, or may be infiltrated into the diamond grains during HPHT sintering. An exemplary minimum temperature is about 1200° C. and an exemplary minimum pressure is about 35 kbars. Typical processing is at a pressure of about 45 kbar and 1300° C. Those of ordinary skill will appreciate that a variety of temperatures and pressures may be used, and the scope of the present invention is not limited to specifically referenced temperatures and pressures.

Diamond grains useful for forming PCD may include any type of diamond particle, including natural or synthetic diamond powders having a wide range of grain sizes. For example, such diamond powders may have an average grains size in the range from submicrometer in size to 100 micrometers, and from 1 to 80 micrometers in other embodiments. Further, one skilled in the art would appreciate that the diamond powder may include grains having a mono- or multi-modal distribution.

Synthetic diamond powder is known to include small amounts of solvent metal catalyst material and other materials entrained within the diamond crystals themselves. Unlike synthetic diamond powder, natural diamond powder does not include such solvent metal catalyst material and other materials entrained within the diamond crystals. It is theorized that the inclusion of materials other than the solvent catalyst in the synthetic diamond powder can operate to impair or limit the extent to which the resulting PCD body can be rendered thermally stable, as these materials along with the solvent catalyst must also be removed or otherwise neutralized.

The diamond grain powder, whether synthetic or natural, may be combined with or already includes a desired amount of catalyst material to facilitate desired intercrystalline diamond bonding during HPHT processing. Suitable catalyst materials useful for forming the PCD body include those solvent metals selected from Group VIII of the Periodic Table, with cobalt (Co) being the most common, and mixtures or alloys of two or more of these materials. In a particular embodiment, the diamond grain powder and catalyst material mixture may comprise 85-95% by volume diamond grain powder and the remaining amount catalyst material. Alternatively, the diamond grain powder can be used without adding a solvent metal catalyst in applications where the solvent metal catalyst can be provided by infiltration during HPHT processing from the adjacent substrate or adjacent other body to be bonded to the PCD body.

The diamond powder may be combined with the desired catalyst material in a reaction cell, and the reaction cell is then placed under processing conditions sufficient to cause the intercrystalline bonding between the diamond particles. In the event that the formation of a PCD compact comprising a substrate bonded to the PCD body is desired, a selected substrate is loaded into the container adjacent the diamond powder mixture prior to HPHT processing. Additionally, in the event that the PCD body is to be bonded to a substrate, and the substrate includes a metal solvent catalyst, the metal solvent catalyst needed for catalyzing intercrystalline bonding of the diamond may be provided by infiltration, in which case it may not be necessary to mix the diamond powder with a metal solvent catalyst prior to HPHT processing.

During HPHT processing, the catalyst material in the mixture melts and infiltrates the diamond grain powder to facilitate intercrystalline diamond bonding. During the formation of such intercrystalline diamond bonding, the catalyst material may migrate into the interstitial regions within the microstructure of the so-formed PCD body that exists between the diamond bonded grains. It should be noted that if too much additional non-diamond material is present in the powdered mass of crystalline particles, appreciable intercrystalline bonding is prevented during the sintering process. Such a sintered material where appreciable intercrystalline bonding has not occurred is not within the definition of PCD. Following such formation of intercrystalline bonding, a PCD body may be formed that has, in one embodiment, at least about 80 percent by volume diamond, with the remaining balance of the interstitial regions between the diamond grains occupied by the catalyst material. In other embodiments, such diamond content may comprise at least 85 percent by volume of the formed PCD body, and at least 90 percent by volume in yet another embodiment. However, one skilled in the art would appreciate that other diamond densities (or gradients of diamond densities) may be used in alternative embodiments. For example, in some embodiments, the PCD bodies being leached in accordance with the present disclosure include what is frequently referred to in the art as "high density" PCD, which refers to a diamond body having a diamond content of at least 90 percent by volume. However, in other embodiments, the high density PCD used in the method of the present disclosure may have a density of at least 92 percent by volume up to 97 percent by volume. One skilled in the art would appreciate that conventionally, as diamond density increases, the leaching time (and potential inability to effectively leach) similarly increases.

Masking a Cutting Element

The PCD layer may be attached to a substrate during the formation of the PCD layer or subsequent to forming the PCD layer. Embodiments disclosed herein may have carbide substrate such as, for example, a cemented tungsten carbide substrate formed from tungsten carbide particles dispersed in a binder metal matrix, such as iron, nickel, or cobalt.

Once the PCD layer is attached to the substrate, a mask may then be applied to the cutting element such that the mask covers at least the entire outer surface of the substrate. In embodiments of the present disclosure, the mask may also cover a portion of the outer side surface of the diamond layer. As used herein, a "mask" refers to a masking coating, a pre-formed mask or an institute mask that coats the outer surface of a portion of a cutting element to protect the masked portion from a leaching environment. In certain embodiments, the term "mask" may be interchangeable with the term "masking coating" or "coating." In other embodiments described below, the term "mask" may be interchangeable with the term "pre-formed mask" or "institute mask."

Figure 3:
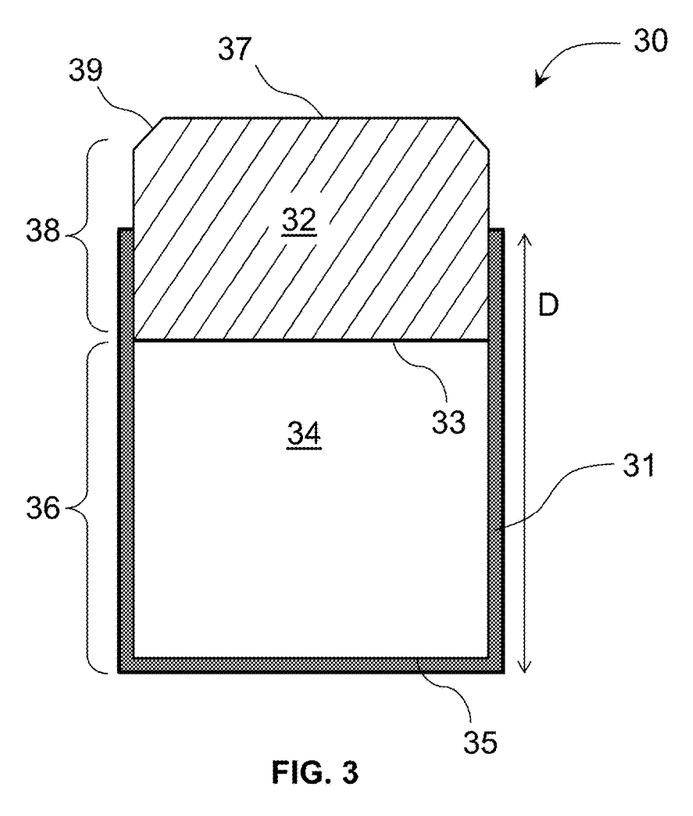
FIG. 3 is a cross-sectional view of a masked PCD cutting element according to embodiments of the present disclosure.

Referring to FIG. 3, a PCD cutter 30 has a PCD layer 32 attached to a substrate 34. The substrate 34 has a bottom surface 35 and a substrate side surface 36. The PCD layer has a cutting face 37 and a diamond layer side surface 38. An interface 33 is formed between the PCD layer 32 and the substrate 34. The substrate side surface 36 and the diamond layer side surface 38 form the outer circumferential surface of the PCD cutter 30. Additionally, as shown in FIG. 3, the intersection of the diamond layer side surface 38 and the cutting face 37 forms a cutting edge 39, which in this case is a bevel. A mask 31 is applied to the outer surface of the PCD cutter 30 such that it covers the entire bottom surface 35 of the substrate and extends a distance D from the bottom surface 35 up the outer circumferential surface of the PCD cutter 30 toward the cutting face 37 to cover the entire substrate side surface 36 and a portion of the diamond layer side surface 38.

Figure 4A:
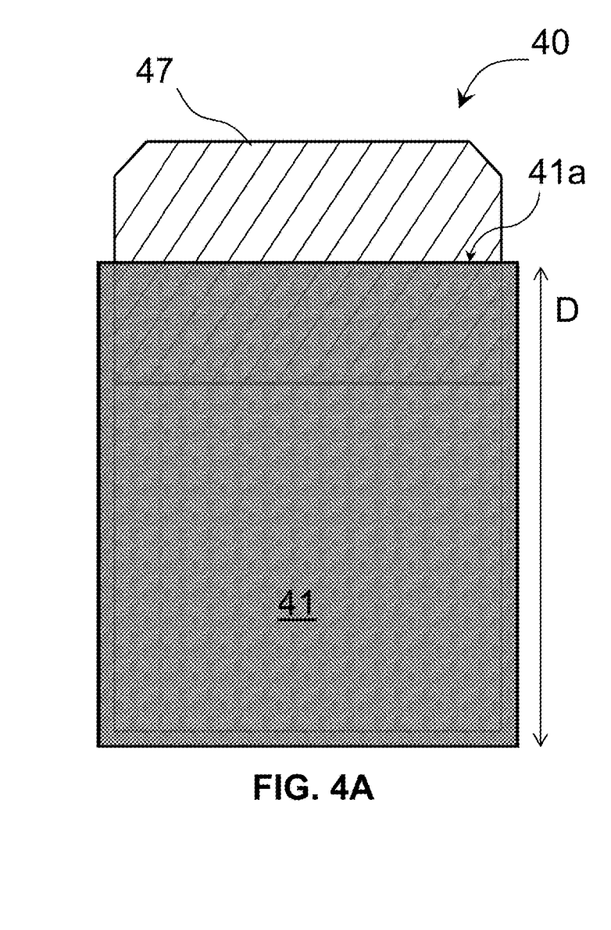
FIGS. 4A-B show side views of masked PCD cutting elements according to embodiments of the present disclosure.
Figure 4B:
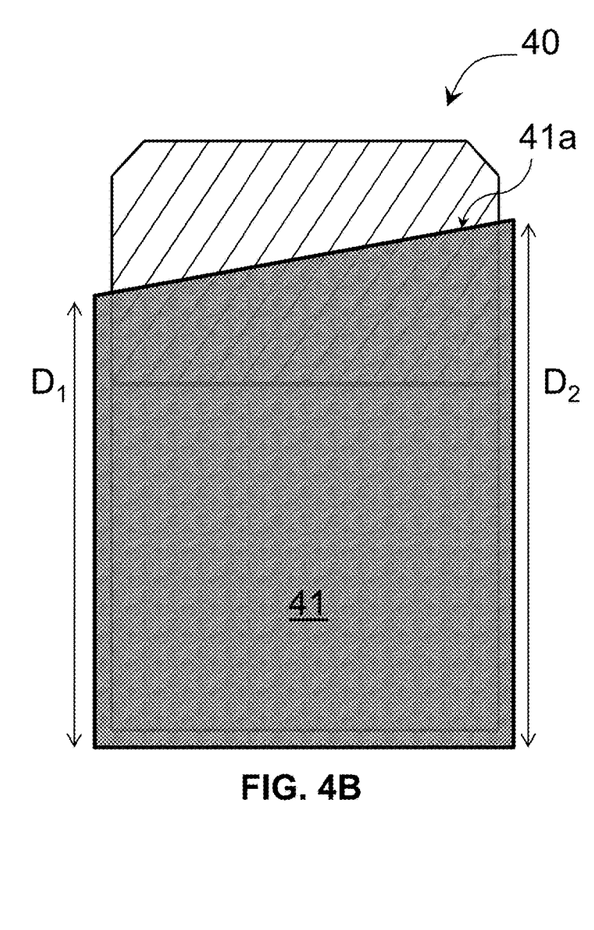

In some embodiments, a mask may extend a uniform distance around the outer side surface of a cutting element from the bottom surface. In other embodiments, a mask may be applied to the outer surface of a cutting element such that the mask extends a non-uniform distance around the outer circumferential surface of the cutting element from the bottom surface toward the cutting face of the cutting element. For example, referring to FIGS. 4A and 4B, masked cutting elements are shown as having a mask extending up the side surface of the cutting elements. In FIG. 4A, the mask 41 extends the same distance D around the outer side surface of a cutting element 40 such that the mask has a planar top end 41a that is parallel with the cutting face 47. In FIG. 4B, the mask 41 extends up the side surface of a cutting element 40 to varying but continuous distances $D_1$, $D_2$, etc. along the outer circumferential surface of the cutting element 40 such that the mask 41 has a slanted top end 41a (i.e., not parallel to the cutting face). It is within the scope of this disclosure that the top of the mask may form other non-planar, or non-continuous shapes. For example, in some embodiments, the unmasked portion of the cutting element may be designed to have a particular shape or depth (from the cutting face) such that upon leaching the unmasked portion, residual stresses in the PCD cutting element are minimized.

A mask may be applied to a cutting element by applying a masking coating to the outer surface of a cutting element. According to embodiments of the present disclosure, a masking coating may include diamond-like carbon ("DLC") material. As used herein, the term "DLC" or diamond-like carbon" refers to an amorphous carbonaceous coating that possesses a significant amount of (if not all) $sp^3$ hybridization, with a balance of $sp^2$ hybridization. While diamond is traditionally formed in a cubic crystal structure, DLC is amorphous due to the mixture of cubic and hexagonal lattice structure (mixed layer by layer) formed as a result of a high energy process (i.e., PE-CVD, among others). Thus, while DLC can contain pure $sp^3$ carbon and/or a mixture of $sp^3$ and $sp^2$ carbon, it has no long range crystalline order and is referred to as "amorphous." DLC masking coatings may be applied to the outer surface of a cutting element by chemical vapor deposition (CVD) methods, including plasma enhanced chemical vapor deposition (PE-CVD), and hallow cathode PE-CVD, for example.

To apply a DLC masking coating, a carbon precursor such as methane, acetylene, butane, toluene, etc, may be used as the source gas. Properties of the coating may be tailored by adjusting the $sp^3$ (diamond), $sp^2$ (graphite) and $sp^1$ (linear) bonding hybridization ratios in the coating, by varying the source gas and hydrogen content. For example, the highest sp³ ratio (most diamond-like) is obtained by methane, but this also may produce a lower deposition rate compared to higher carbon molecules and also a higher compressive stress, limiting film thickness to approximately 5000 Angstroms. The addition of certain dopants (e.g., silicon or silicon oxide) to the DLC matrix may improve thermal stability and may reduce compressive stress. An organic-based precursor, such as hexemethyldisiloxane can be mixed with the hydrocarbon precursor(s) to introduce these dopants.

Additionally, it is also within the scope of the present disclosure that multiple layers of coatings may be deposited. For example, to produce a thick deposited coating, the deposition process can be modified by deposition of a thin methane-based layer, followed by the use of a higher deposition rate, lower stress precursors such as toluene, or by higher energy ion bombardment to increase adhesion and reduce stress. Alternatively, several layers, including DLC and non-DLC layers, may be deposited on the cutting element. For example, multiple layers may be applied to the cutting element under a DLC top layer to promote adhesion.

Further, masking coatings according to embodiments of the present disclosure may include a wide range of inert materials that are able to sustain strong acid attack under elevated temperature and pressure. For example, masking coatings of the present disclosure may include chemical resistant air dry inks, chemical resistant UV cured inks, Teflon (i.e., polytetrafluoroethylene), and microwave cured materials. Masking coatings made of such materials may be applied by sputter coating, physical vapor deposition ("PVD"), chemical vapor deposition ("CVD"), or other spray coating methods, for example.

Figure 6:
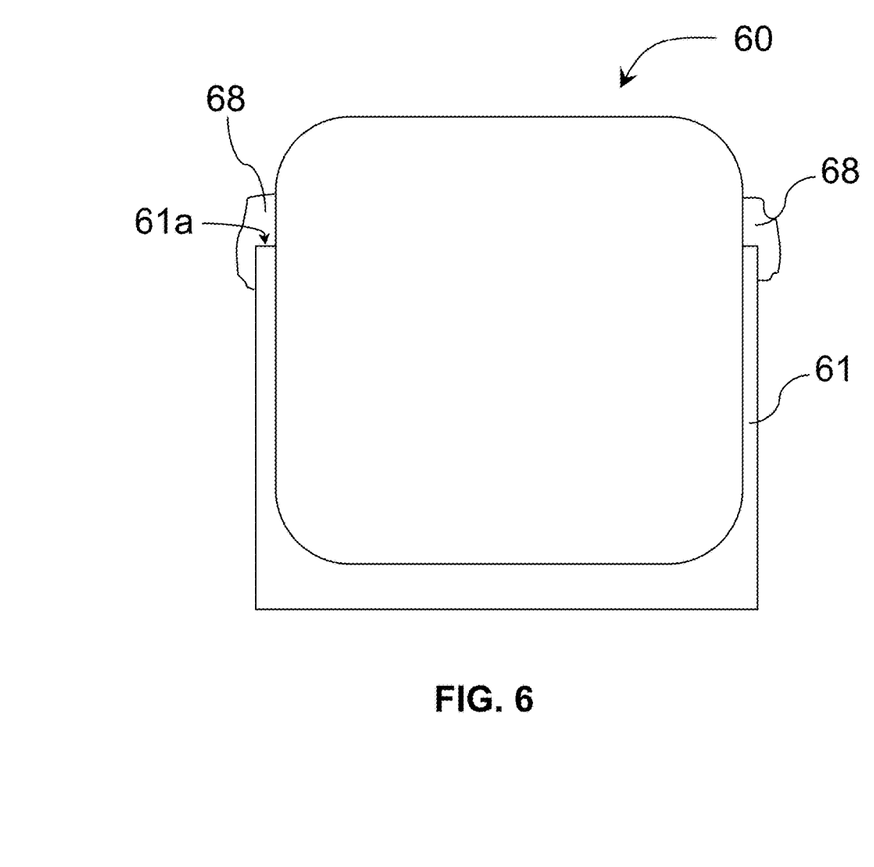
FIG. 6 is a cross-sectional view of a masked cutting element according to embodiments of the present disclosure.

Additionally, it is also within the scope of the present disclosure that multiple layers of coatings may be deposited. According to some embodiments having multiple layers of coatings, a first layer may coat the majority of the cutting element and a second layer may coat only the interface area, or potential gaps, between the cutting element and the first layer. For example, referring to FIG. 6, a mask coating 61 may have potential gaps, or crevices, at the mask top end 61a, between the mask 61 and the cutting element 60. In such instances, a second layer 68 of coating or masking material may be applied to the top end 61a of the mask in order to seal any potential gaps. Advantageously, the first layer may offer processing protection, while the second layer may further prevent processing materials from invading the protected area. The second layer may be made of the same material or a different type of material as required to provide an adequate seal at the interface area. In other embodiments having multiple layers of coatings, a first layer may be applied to coat only the protected area of the cutting element and the second layer may be applied to seal any potential voids or holes in the first layer, i.e., the second layer may be applied over the first layer.

The masking coating deposited may depend on the number of layers, but may generally be less than 200 microns. In particular, the masking coating may be applied so that the mask has a thickness ranging from about 1 micron to about 200 microns. In other embodiments, the masking coating may have a thickness ranging from about 0.5 microns to about 20 microns. While thinner coatings may reduce cost and the likelihood of spalling, defects inside the coating may cause leaching acid to leak in. Thicker coatings may improve continuity of the coating and prevent such acid leakage. Thus, the thickness of the masking coating may depend on, for example, the type of coating and the surface roughness of the surface to be coated.

Advantageously, by masking at least the substrate portion of a cutting element with a masking coating, a protective seal is formed around the masked portion of the cutting element, thereby shielding it from a leaching environment. The leaching environment, while beneficial in forming TSP in a cutting element, may be detrimental to the substrate portion of the cutting element. In particular, the leaching agent may remove or react with the binder material that holds the substrate together. By forming a barrier on the substrate by use of a masking coating, leaching agents are unable to attack and weaken the substrate.

According to other embodiments of the present disclosure, a pre-formed mask may be fitted around a PCD cutting element to protect at least the substrate of a PCD cutting element during a leaching process. As used herein, a "pre-formed mask" refers to a material that has been extruded into the shape of a cup, into which a cutting element snugly fits. A pre-formed mask may also be referred to as a pod, shell, casing, or other like terminology. A pre-formed mask differs from the masking coating described above in that the pre-formed mask holds its shape (i.e., holds the shape of a cup). A pre-formed mask may have special properties that allow the pre-formed mask to reduce in size or shrink in the form of an encapsulating device around a cutting element by use of heat, ultra violet radiation, microwave, etc. However, similar to the masking coating described above, a pre-formed mask covers, or coats, the outer surface of at least the substrate of a cutting element to protect it from a leaching environment.

In particular, a pre-formed mask may be formed by extruding polyvinyl chloride or other suitable materials, such as any acid-proof material, a high temperature material, and/or plastics such as polyvinylidene fluoride, into the shape of a cup. Methods of extruding a pre-formed mask include any that are known to those skilled in the art, including, for example, thermoforming, tubing extruding, or blown film extrusion methods. Once the pre-formed mask is fitted around a cutting element, a second layer material may be applied at the interface area between the pre-formed mask and the cutting element to provide additional sealing protection, such as described above.

Figure 5A:
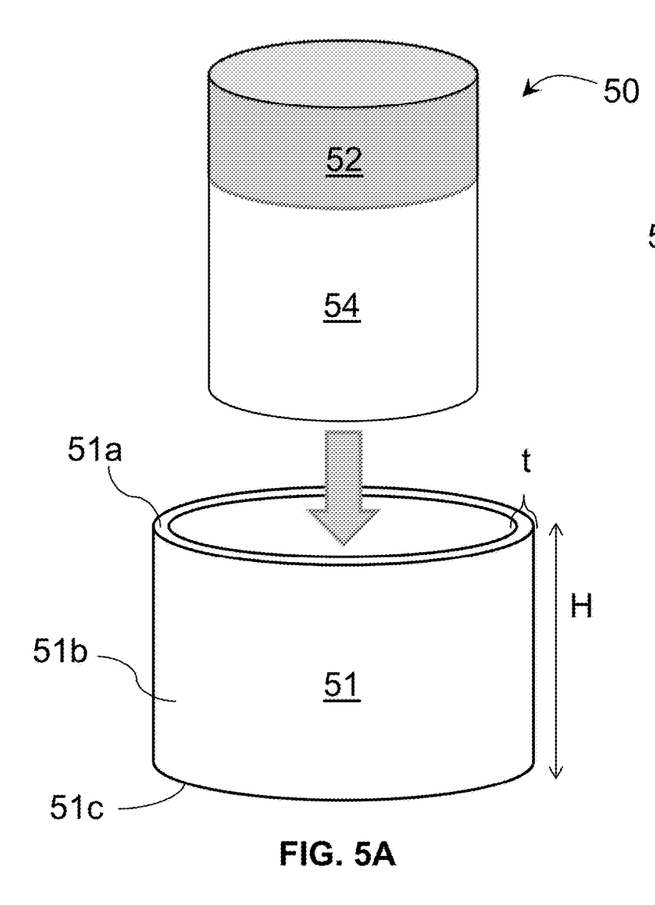
FIGS. 5A-B is an illustration of steps for forming a masked PCD cutting element according to embodiments of the present disclosure.
Figure 5B:
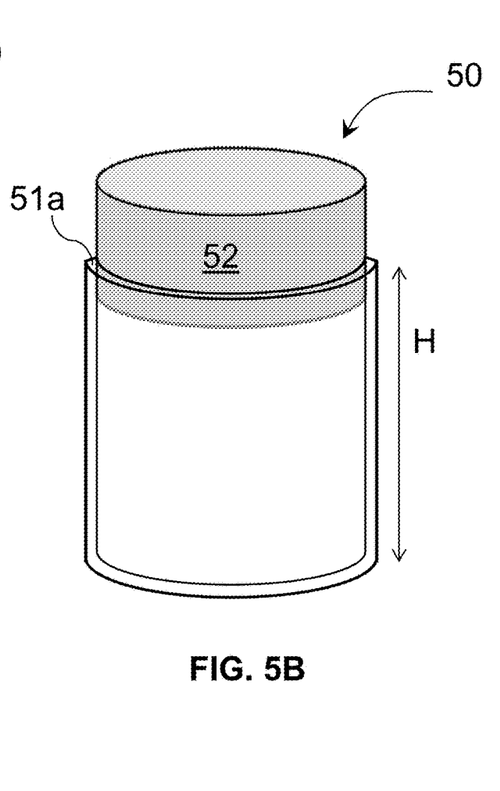

Referring now to FIGS. 5A and 5B, a PCD cutting element masked with a pre-formed mask is shown. In FIG. 5A, a pre-formed mask 51 is extruded into a cup shape having a bottom 51c and a cylindrically-shaped wall 51b extending perpendicular from the bottom 51c. The wall 51b has a thickness t and a height H. According to embodiments of the present disclosure, a pre-formed mask may have a wall thickness t. The thickness t may be determined based on the ability of the pre-formed mask material to resist process chemical attack over time and on the temperature of the process and temperature limitations of the pre-formed mask material. A PCD cutter 50 having a polycrystalline diamond layer 52 attached to a substrate 54 may then be fitted into the pre-formed mask 51 by inserting the cutter 50, substrate 54 end first, through the top end 51a of the pre-formed mask 51. The pre-formed mask 51 may be made so that the inner diameter is only slightly larger than the diameter of the cutter 50, thereby providing a snug fit between the pre-formed mask 51 and the cutter 50. As shown in FIG. 5B, the pre-formed mask 51 covers at least the substrate and extends over a portion of the diamond layer 52. In some embodiments, a pre-formed mask may have a wall height H that covers only the substrate. In other embodiments, the wall height may extend over the substrate outer surface to about 1 to 1.5 mm from the cutting surface of the diamond layer.

According to embodiments of the present disclosure, a pre-formed mask may be fitted around a cutting element by inserting the cutting element into a pre-formed mask, placing the assembly in a vacuum, and applying heat to the pre-formed mask to tighten the pre-formed mask around the cutting element. It should be appreciated that depending on the type of material used to make the pre-formed mask, different vacuum pressures and temperatures may be used to shrink-fit the pre-formed mask to the cutting element. A sealing process, as described above, may then be used to seal the top part of the pre-formed mask to the outer surface of the cutting element.

According to yet other embodiments of the present disclosure, an institute mask may be formed around a PCD cutting element to protect at least the substrate of a PCD cutting element during a leaching process. As used herein, an "institute mask" refers to a material that encases one or more cutting elements by injection molding or similar practices known in the art. An institute mask may be made of the protective mask materials described above, such as plastics, acid-proof materials, and/or high temperature materials. Methods of encasing one or more cutting elements with an institute mask may include, for example, enclosing one or more cutting elements into a single block or fixture. A protective material used to form the institute mask may then be injected into the block or fixture around the one or more cutting elements to encase the cutting elements, thereby forming the institute mask. Advantageously, by using injection molding practices to form an institute mask, one or more cutting elements may be coated with a protective material during a single process, thereby reducing processing time.

Leaching

Upon masking a PCD cutting element according to embodiments of the present disclosure, the masked cutting element may be subjected to a leaching process. The seal formed between the mask and the PCD cutting element prevent leaching agents from contacting, and thus removing material from the part of the cutting element protected by the mask. Thus, when subjecting a masked PCD cutting element according to embodiments of this disclosure to a leaching process, the catalyst material is removed only from the unmasked portion of the PCD cutting element, which includes at least a portion of the PCD layer.

As used herein, the term "removed" refers to the reduced presence of catalyst material in the PCD layer, and is understood to mean that a substantial portion of the catalyst material no longer resides in the leached PCD. However, one skilled in the art would appreciate that trace amounts of catalyst material may still remain in the microstructure of the leached PCD layer within the interstitial regions and/or adhered to the surface of the diamond grains. Alternatively, rather than actually removing the catalyst material from the leached portion of the PCD layer, the selected region of the PCD layer can be rendered thermally stable by treating the catalyst material in a manner that reduces or eliminates the potential for the catalyst material to adversely impact the intercrystalline bonded diamond at elevated temperatures. For example, the catalyst material may be combined chemically with another material to cause it to no longer act as a catalyst material (or to have less thermal mismatch with diamond), or can be transformed into another material that again causes it to no longer act as a catalyst material (or to have less thermal mismatch with diamond). Accordingly, as used herein in reference to the catalyst material, the terms "removing substantially all" or "substantially free" is intended to cover the different methods in which the catalyst material can be treated to no longer adversely impact the intercrystalline diamond in the leached portion of the PCD layer with increasing temperature.

The quantity of the catalyst material remaining in the PCD microstructure after the PCD layer has been subjected to a leaching treatment may vary, for example, on factors such as the treatment conditions, including treatment time. Further, one skilled in the art would appreciate that it may be acceptable or desired in certain applications to allow a small amount of catalyst material to stay in the leached area of the PCD layer. In a particular embodiment, the leached area of the PCD layer may include up to 1-2 percent by weight of the catalyst material. However, one skilled in the art would appreciate that the amount of residual catalyst present in the leached area of a PCD layer may depend on the diamond density of the material and the thickness of the area leached.

As described above, a conventional leaching process involves the exposure of an object to be leached with a leaching agent, such as described in U.S. Pat. No. 4,224,380, which is herein incorporated by reference in its entirety. In select embodiments, the leaching agent may be a weak, strong, or mixtures of acids. In other embodiments, the leaching agent may be a caustic material such as NaOH or KOH. Suitable acids may include, for example, nitric acid, hydrofluoric acid, hydrochloric acid, sulfuric acid, phosphoric acid, or perchloric acid, or combinations of these acids. In addition, other acidic and basic leaching agents may be used as desired. Those having ordinary skill in the art will appreciate that the molarity of the leaching agent may be adjusted depending on the time desired to leach, concerns about hazards, etc.

PCD cutting elements that have been masked according to embodiments of the present disclosure may be leached by conventional means. For example, a masked PCD cutting element may be placed in a leaching agent bath, wherein the masked PCD cutting element is placed in the bath container with the PCD layer facing the bottom of the container so that the PCD layer may be fully immersed in the leaching agent. Other exemplary leaching methods may also include subjecting the PCD cutting element to increased pressures and/or increased temperatures in addition to immersing the PCD layer in a leaching agent.

In an embodiment of the present disclosure, a masked PCD cutting element may be held in place during the leaching process to ensure more controlled exposure of the PCD layer to the leaching bath. In particular, a masked PCD cutting element may be held in place above a leaching agent bath such that a specific amount of the PCD layer (e.g., a uniform distance from the cutting face of the PCD layer) is immersed in the leaching agent. Means of holding a masked PCD cutting element in place during the leaching process may include using a magnetic capturing device. For example, a masked PCD cutting element according to embodiments of the present disclosure may be held by a magnetic capturing device so that the area immersed in a leaching agent bath includes the distance of the desired leaching depth. In some embodiments, the desired leaching depth may range from about 1,000 microns to about ⅔ of the diamond table thickness from the cutting face of the PCD layer. In other embodiments, the desired leaching depth may range from about 600 microns to about 800 microns.

A magnetic capturing device may be a fixture, form, frame or other shape that has strong magnets imbedded within it that may be used to attract and hold cutting elements, once coated or masked, in place during the chemical process. The protected cutting elements may be held in such a manner as to suspend them in a liquid chemical or otherwise held and exposed to a vapor or mist chemical for processing. In other embodiments, the use of a strong magnet may also be used to fabricate a fixture or device for holding the cutting element during application, curing, etc. of a mask and then again during the mask removal process. In embodiments using a magnetic capturing device, the magnets may be protected by the device casing or by other means from the processing environments, including during applying a mask, leaching, and removing a mask.

Removal of Coatings

According to embodiments of the present disclosure, upon leaching an unmasked portion of a cutting element, masks may be removed by thermal, mechanical, or other processes. Processes that will cause the mask materials to breakdown or weaken may be used to remove the mask, which may be chosen based on the time, cost, and susceptibility of the mask material to break down. For example, according to some embodiments of the present disclosure, masks may be removed by grit blasting or grinding in order to break the bond between the surface of the cutting element and the mask.

Advantageously, by leaching a masked PCD cutting element according to embodiments of the present disclosure, greater control may be exercised over the size and shape of the PCD cutting element that is leached. For example, partially leached prior art PCD cutting elements are typically limited to having a planar interface between the portion of PCD that is exposed to a leaching agent and the remaining portion of the PCD cutting element. However, embodiments of the present disclosure may have curved or other non-planar unmasked sections of the PCD cutting element to be leached. Thus, higher stress regions of a PCD cutting element may be targeted and selectively leached according to embodiments disclosed herein. Furthermore, by using DLC materials to mask a cutting element, the DLC mask provides resistance to leaching acids and to increased processing temperatures and pressures, while also being able to form a strong bond with the cutting element.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for leaching a cutting element, comprising:
providing a cutting element, the cutting element comprising a substrate and polycrystalline diamond layer attached to the substrate;
masking at least the substrate portion of the cutting element with a mask using chemical vapor deposition or physical vapor deposition, leaving an unmasked portion of the diamond layer of the cutting element;
placing the masked cutting element in a leaching agent, wherein at least the unmasked portion of the cutting element contacts the leaching agent; and
removing the masked cutting element from the leaching agent.

2. The method of claim 1, further comprising removing the mask.

3. The method of claim 1, wherein the step of placing the masked cutting element in the leaching agent further comprises holding the masked cutting element in place.

4. The method of claim 1, wherein the masked cutting element is held in place by a magnetic capturing device.

5. The method of claim 1, wherein the mask comprises diamond-like carbon.

6. The method of claim 1, wherein the mask comprises a material selected from a chemical resistant air dry ink and a chemical resistant UV cured ink.

7. The method of claim 1, wherein the mask comprises an institute mask.

8. The method of claim 1, wherein the step of masking comprises encasing the cutting element with a mask material using injection molding.

9. A method of leaching a cutting element, comprising:
providing a cutting element, comprising a substrate and polycrystalline diamond layer attached to the substrate;
fitting at least the substrate portion of the cutting element in a pre-formed mask, leaving an unmasked portion of the diamond layer of the cutting element;
placing the pre-formed mask and the cutting element in a vacuum and applying heat to the pre-formed mask to tighten the pre-formed mask around the cutting element;
applying a second layer at the interface of the pre-formed mask and the cutting element covering a portion of the pre-formed mask and a portion of the cutting element;
placing the cutting element in a leaching agent, wherein at least the unmasked portion of the cutting element contacts the leaching agent; and
removing the cutting element from the leaching agent.

10. The method of claim 9, further comprising sealing the pre-formed mask to the cutting element.

11. The method of claim 9, further comprising removing the pre-formed mask.

12. The method of claim 9, wherein the pre-formed mask comprises polyvinylchloride.

13. The method of claim 9, wherein the step of placing the cutting element in the leaching agent further comprises holding the cutting element in place.

14. A method of leaching a cutting element, comprising:
providing a cutting element, comprising a substrate and polycrystalline diamond layer attached to the substrate;
fitting at least the substrate portion of the cutting element in a pre-formed mask, leaving an unmasked portion of the diamond layer of the cutting element;
applying a second layer at the interface of the pre-formed mask and the cutting element covering a portion of the pre-formed mask and a portion of the cutting element;
placing the cutting element in a leaching agent, wherein at least the unmasked portion of the cutting element contacts the leaching agent, and wherein the masked cutting element is held in place by a magnetic capturing device; and
removing the cutting element from the leaching agent.

15. The method of claim 9, wherein the applying the second layer comprises using chemical vapor deposition or physical vapor deposition to apply the second layer at the interface of the pre-formed mask and the cutting element covering a portion of the pre-formed mask and a portion of the cutting element.

16. The method of claim 14, further comprising sealing the pre-formed mask to the cutting element.

17. The method of claim 14, further comprising removing the pre-formed mask.

18. The method of claim 14, wherein the pre-formed mask comprises polyvinylchloride.

19. The method of claim 14, wherein the step of placing the cutting element in the leaching agent further comprises holding the cutting element in place.

20. The method of claim 14, wherein the applying the second layer comprises using chemical vapor deposition or physical vapor deposition to apply the second layer at the interface of the pre-formed mask and the cutting element covering a portion of the pre-formed mask and a portion of the cutting element.

* * * * *